Jan. 21, 1975 G. C. DOMINICK ET AL Re. 28,308

CASH ACCEPTANCE RECEPTACLE

Original Filed May 27, 1971 5 Sheets-Sheet

CASH ACCEPTANCE RECEPTACLE

Original Filed May 27, 1971 5 SheetS-Sheet 3

CASH ACCEPTANCE RECEPTACLE

Original Filed May 27, 1971 5 Sheets-Sheet 4

United States Patent Office

Re. 28,308
Reissued Jan. 21, 1975

28,308
CASH ACCEPTANCE RECEPTACLE

George G. Dominick, Hoffman Estates, Rinaldo Sciacero, Arlington Heights, Leonard J. Weber, Broadview, George I. Wimpffen, Wheaton, and Theodore Louis Kardos, Chicago, Ill., by Qonaar Corporation, Elk Grove Village, Ill., assignee Original No. 3,693,870, dated Sept. 26, 1972, Ser. No. 147,360, May 27, 1971. Application for reissue Jan. 30, 1974, Ser. No. 438,026
Int. Cl. E05g *1/00*
U.S. Cl. 232—16 28 Claims

Matter enclosed in heavy brackets [ ] appears in the original patent but forms no part of this reissue specification; matter printed in italics indicates the additions made by reissue.

ABSTRACT OF THE DISCLOSURE

A collection receptacle or vault for receiving valuables from a cash box. The cash box is of the type including a discharge opening and a movable wall normally covering the discharge opening. The receptacle includes a door providing access to an area receiving the cash box. A handle is located on the exterior of the door, and when the door is closed and the handle turned, the cash box is actuated for dumping the valuables through the discharge opening of the cash box into a vault area. Locking mechanisms are provided so that once the rotation is commenced, access to the cash box cannot be obtained until after the dumping of the valuables has occurred. The locking mechanisms include a pawl and ratchet mounted on the door of the receptacle, the pawl and ratchet preventing return movement of the cash box and rotating mechanisms until dumping is completed.

This invention concerns a collection receptacle or vault construction designed for receiving and holding cash or other valuables. The invention is particularly suited for the receipt of fares, tolls, and other fees which are accepted in large numbers from the general public by transportation systems, vending machine companies, and similar operations.

In operations of the type described, individuals deposit cash in collection structures such as vending machines or fare collection boxes. The contents of these collection boxes must then be moved to some centralized location for counting of receipts, for deposit in banks, etc.

The collection of fares or similar payments has caused many problems, and transit systems are typical in this regard. Handling problems have been recognized particularly in the case of large transit systems where fares from many individual vehicles are received. Standard systems require handling of the fares by the operator of the vehicle in transferring the fares from the collection receptacle to coin changers or money bags. Additional handling is then required in delivering the fares to some central collection point. All of this handling takes time and, therefore, leads to additional expense. The problem is compounded where the operator of the vehicle is required to make some written account of the collection which must in turn be recorded at the central collection area.

Aside from the inefficiencies which characterize present collection systems, there are extreme security problems. Thus, pilferage on the part of anyone handling funds collected is extremely difficult to prevent, and a wide variety of techniques have been developed for cheating existing fare collection systems. The techniques involve mechanical alterations of the fare box structures thereby avoiding recording of the fares by counting mechanisms associated with the fare boxes, for example, by including means which divert coins deposited. Where the operator is required to handle deposits, schemes are devised which result in improper recording of amounts collected.

Robbery also constitutes a very severe problem in any system requiring fare collection. A bus driver, for example, is extremely vulnerable to robbery since in a matter of seconds, a robber can enter the bus and take the driver's coin changer and money bags. Since buses operate at night—often in remote locations—it is virtually impossible to adequately protect against such occurrences.

Because of the various problems referred to, transit authorities have reverted to "exact fare" collections. In such a system, passengers deposit money in a collection box; however, the driver is not required to carry any change, and the money is never removed from the collection box by the driver. Accordingly, the passenger must have the exact fare in his possession or must deposit an excess amount. The most that such systems require of the driver is that a receipt be given for any excess amount deposited in which case the passenger can obtain a refund at some specified location.

Since the driver does not carry any cash for change and is not authorized to personally accept any fares, the temptation to rob the driver is removed. It is, however, desirable to provide a collection system which is otherwise characterized by efficient operation and which includes mechanisms and a mode of operation which will discourage pilfering and schemes for cheating the system.

Copending application Ser. No. 20,884, filed on Mar. 19, 1970 and entitled "Exact Fare System" describes mechanisms which are particularly suitable for the handling of "exact fare" collections. As explained in that application, a cash box is removably mounted in a fare box, and all deposits made in the fare box are automatically delivered to the cash box. When the cash box is removed, it is automatically secured against unauthorized entry. Specifically, a movable wall system of the cash box provides for automatic blocking of the discharge opening of the cash box in the course of the removal operation. This same cash box arrangement can, of course, be employed in various systems other than transit systems, that is, wherever cash or other valuables are collected and are to be secured against unauthorized removal.

In a typical operation, each cash box is brought to a central collection area whereby the contents of the cash box can be located in a vault in an authorized fashion. It is, of course, important to provide security at this time in order to prevent pilfering or any malfunctioning of the collection arrangement.

It is a general object of this invention to provide an improved collection receptacle or vault construction whereby valuables can be transferred from cash boxes without the danger of loss of such valuables.

It is a more specific object of this invention to provide a collection receptacle of the type described which operates in a highly efficient manner whereby secure but rapid transfer of valubles from a cash box to a collection receptacle can be accomplished.

These and other objects of this invention will appear hereinafter, and for purposes of illustration but not of limitation, specific embodiments of the invention are shown in the accompanying drawings in which.

This invention generally relates to a collection receptacle or vault construction for receiving valuables from a box in which the valuables were deposited. The collection receptacle of the invention is designed for use with boxes of the type defining a discharge opening and having a movable wall which normally covers the discharge opening. The movable wall is secured under normal conditions so that unauthorized access to the box is avoided.

The collection receptacle of this invention includes a receiving area for the box containing cash or other valuables. The door of the collection receptable is provided with means for engaging the cash box when the door is closed. An actuating means for these engaging means is provided so that discharge of the contents of the cash box can be accomplished after the door is closed.

In the preferred form of this invention, the door of the collection receptacle includes a rotatable drive disc for engaging the cash box when the door is closed. A handle is located on the outside of the door for rotating the disc whereby relative movement of the cash box walls can be accomplished to thereby open the cash box discharge opening, and to thereby discharge the contents of the cash box into the vault area of the construction.

The door includes a locking mechanism which prevents opening of the door once rotation has commenced. Specifically, a channel is provided behind a receptacle wall, and a portion of the door assembly is moved within this channel when rotation commences. The door cannot be opened when this portion of the door is rotated within the channel, and return rotation which would permit opening of the door is prevented by a pawl and ratchet mechanism mounted on the door. The mechanisms will not permit return rotation until after a complete forward rotation is accomplished to achieve discharge of the contents of the cash box.

The preferred structure of the invention also includes an additional locking mechanism which prevents access to the vault area which receives the valuables discharged from cash boxes. Specifically, a shutter is normally located for blocking access to the interior of the vault area, and this shutter is locked in place. The door of the collection receptacle includes means for unlocking the shutter; however, this unlocking is only accomplished when the door is closed. Upon rotation of the mechanisms employed for discharging valuables from the cash box, the shutter will be automatically moved away from blocking position whereby the contents of the cash box will be discharged into the vault area. The shutter will then automatically return to blocking position upon return movement of the rotating mechanisms, and the shutter will be automatically locked in blocking position before the door of the receptacle can be opened.

Figure 2:
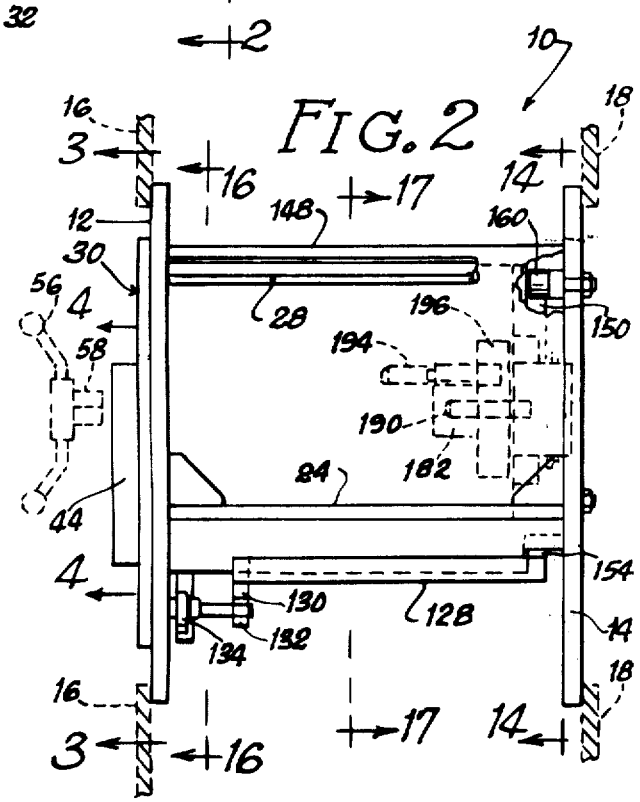
FIG. 2 is a side elevational view of the receptacle construction taken about the line 2—2 of FIG. 1.
Figure 5:
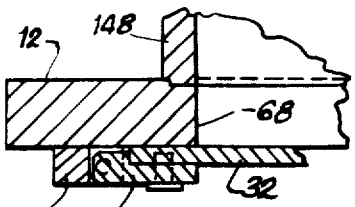
FIG. 5 is an enlarged fragmentary cross sectional view taken about the line 5—5 of FIG. 1.
Figure 16:
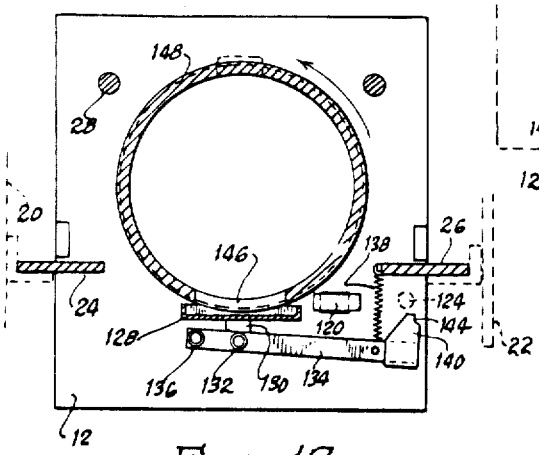
FIG. 16 is a vertical cross-sectional view of the receptacle taken about the line 16—16 of FIG. 2.

The drawings illustrate a collection receptacle mechanism generally designated by the numeral 10. This receptacle mechanism includes a front plate 12 and a back plate 14, and the operating parts of the receptacle are mounted between these plates. For purposes of clarity, walls surrounding the plates 12 and 14 are not shown in detail. It will be understood, however, that the receptacle 10 is to be associated with a surrounding vault structure including front wall 16, rear wall 18 (FIG. 2) and side walls 20 and 22 (FIG. 16). The character of these walls can, of course, vary considerably, depending upon the degree of security desired, on the need for protecting moving parts, and on the need for providing access to such parts for maintenance purposes. As shown in FIG. 16, the receptacle is provided with horizontally disposed plates 24 and 26 secured between the plates 12 and 14 to provide for mounting of the operating mechanisms of the collection receptacle. A pair of longitudinally extending rods 28 also extend between the plates 12 and 14 to assist in securing the assembly.

The receptacle is provided with a door 30 comprising a plate 32 which is attached by means of a hinge 34 to the front plate 12. The hinge is secured by means of screws 36 having flared ends which extend within the hinge, with the other ends being pivotable within retaining blocks 38. This arrangement provides a strong hinge which resists tampering.

Figure 1:
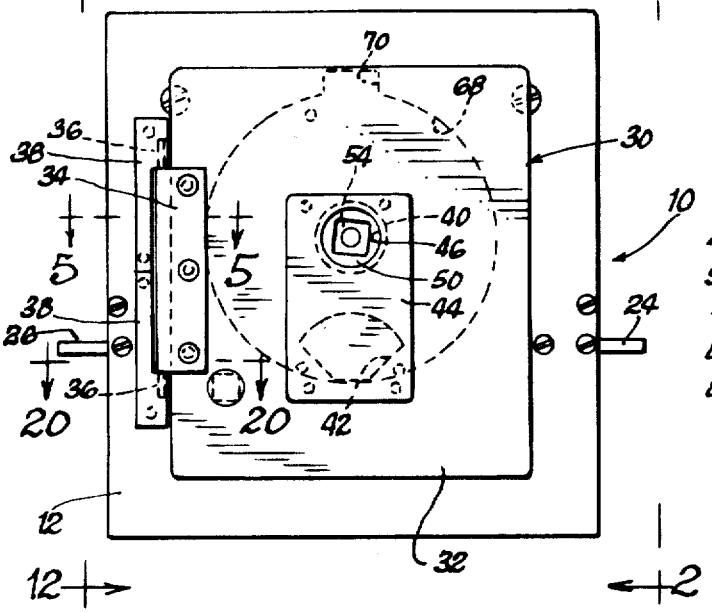
FIG. 1 is a front elevational view of a collection receptacle of the type contemplated by this invention, the receptacle being illustrated without its surrounding walls.
Figure 4:
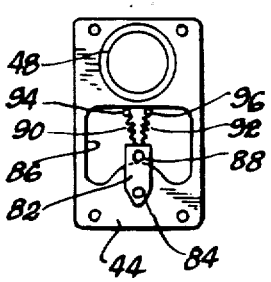
FIG. 4 is a rear elevational view of the mounting means employed for the locking pawl mechanism taken about the line 4—4 of FIG. 2.
Figure 3:
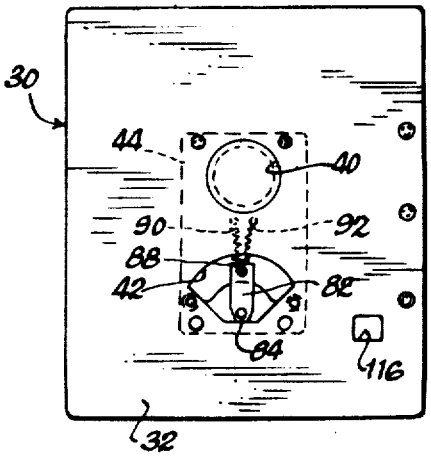
FIG. 3 is a rear elevational view of the receptacle door with the cash box drive disc removed, taken about the line 3—3 of FIG. 2.

The door plate 32 defines a circular opening 40 and a fan-shaped opening 42 (FIG. 3). A block 44 is secured to the plate 32 with a circular opening 46 defined by the block being aligned with the opening 40. A bearing ring 48 is secured to the block within the opening 46 and the stem 50 of drive disc 52 is positioned within the bearing. A square bore 54 is defined by the end of the stem 50 whereby a handle 56 having a square projection 58 can be employed for rotating the drive disc from the exterior of the receptacle.

The drive disc is secured to the plate 32 by means of stop members 62 and 64 which are attached to the back side of the plate. These stop members include edge portions which overlap the rim portion 60 of the disc. The disc also includes a projecting portion 66, and the stop members 62 and 64 extend into the path of movement of the projection 66 whereby rotation of the disc is limited.

The front plate 12 of the receptacle defines a central opening 68 which is large enough to receive the drive disc and associated stop members 62 and 64. A notch 70 is defined by this central opening, and this notch is dimensioned to receive the extension 66 of the drive disc when the door is closed.

Figure 6:
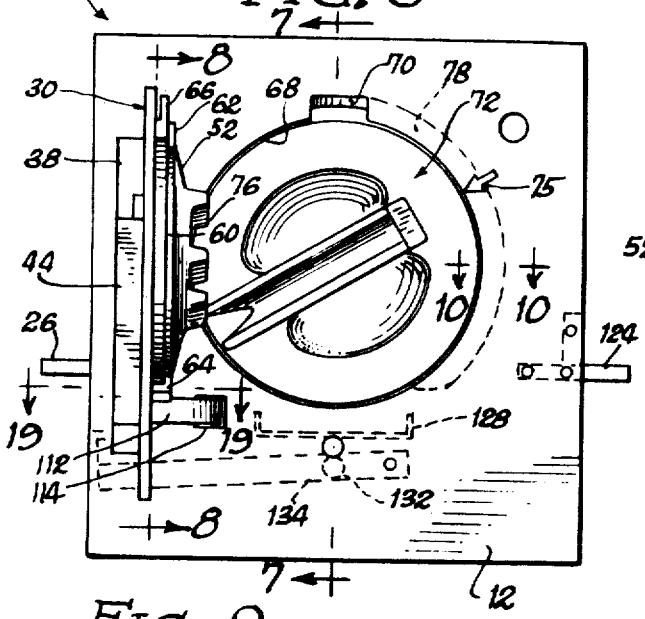
FIG. 6 is a front elevational view of the receptacle illustrated with the door open.

The cash box 72 includes a handle 74 which is lined up in the position shown in FIG. 6 when properly inserted in the receptacle. An arrow 75 is displayed on the plate 12 to assist in the alignment of the cash box. The drive disc 52 is provided with outwardly extending ridges 76 which fit around the handle when the door is closed. When the disc 52 is properly aligned so that the ridges 76 fit around the handle 74, the extension 66 of the disc will be received within the notch 70.

Figure 11:
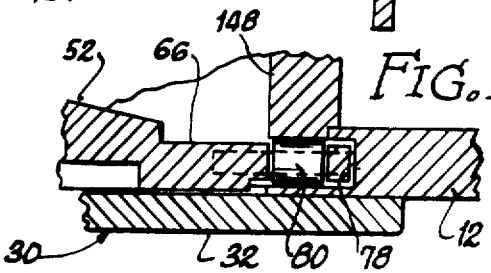
FIG. 11 is an enlarged fragmentary cross sectional view illustrating the structure of FIG. 10 and including the door in the closed position and after rotation into a locked position.
Figure 12:
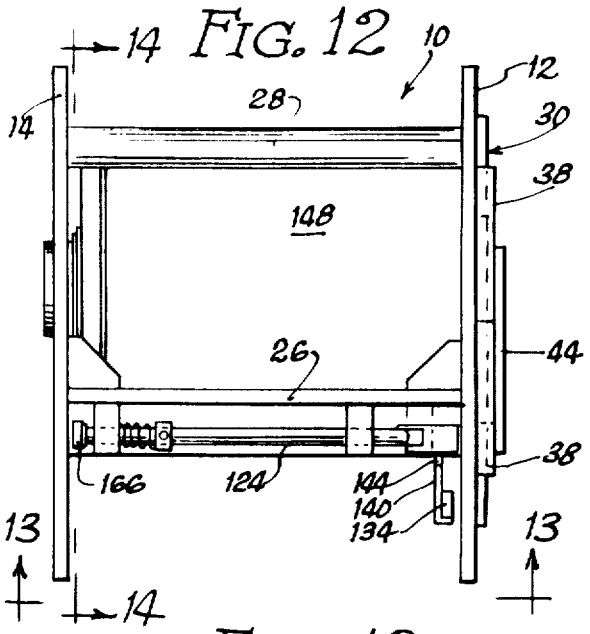
FIG. 12 is a side elevational view of the receptacle taken about the line 12—12 of FIG. 1.
Figure 15:
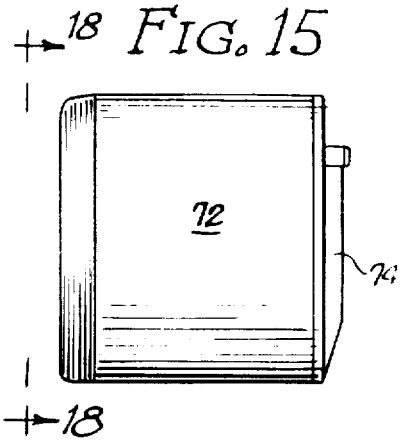
FIG. 15 is a side elevational view of the typical cash box construction.
Figure 13:
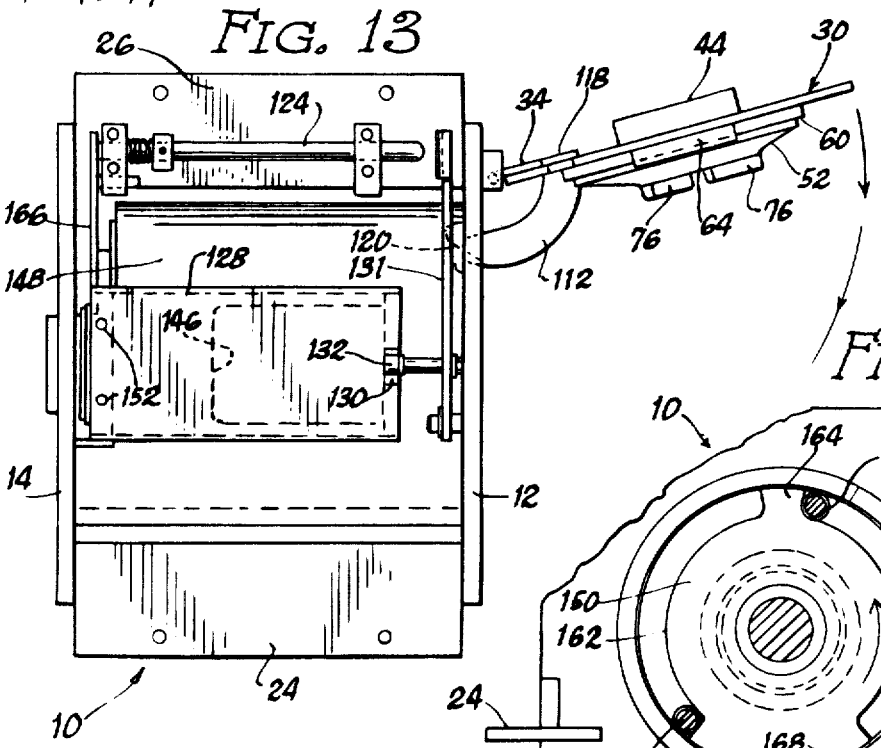
FIG. 13 is a bottom plan view of the receptacle taken about the line 13—13 of FIG. 12.
Figure 14:
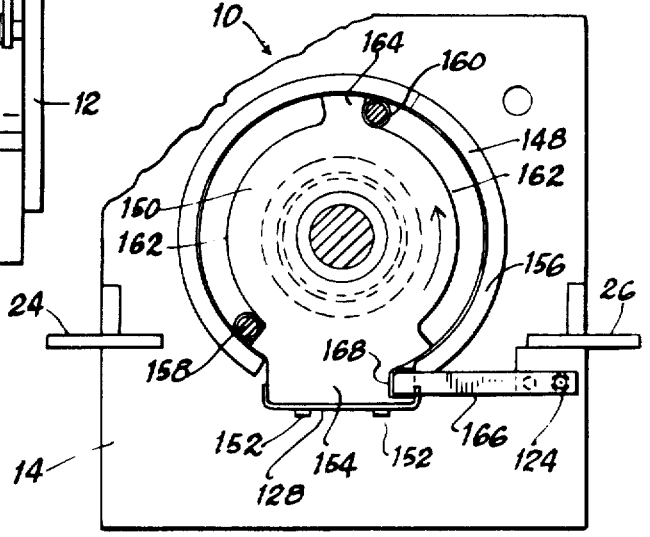
FIG. 14 is a fragmentary vertical cross-sectional view taken about the line 14—14 of FIG. 12.

The notch 70 communicates with a groove 78 which is cut along the edge of the opening 68 and which extends for 135°. When the drive disc is turned, the extension 66 moves within this groove as best illustrated in FIG. 11. A pair of rollers 80 are mounted on the extension 66 to provide for smooth operation of the disc within the groove. It will be appreciated that when the disc is rotated in the manner described, the cash box 72 will also turn within the receptacle because of the engagement of the ridges 76 with the handle 74.

The block 44 which supports the bearing for disc 52 also provides a housing for a pawl arm 82. The arm 82 is pivotally mounted on the rear wall of the block at 84. A recess 86 is formed in the rear wall of the block, and a pin 88 has one end extending within this recess. The springs 90 and 92 have their lower ends attached to this pin with the upper ends being attached, respectively, to pins 94 and 96 located within the recess 86. The arrangement is such that the arm 82 can be pivoted in either direction but will normally be retained in the upright position because of the pulling action of the springs 90 and 92.

Figure 8:
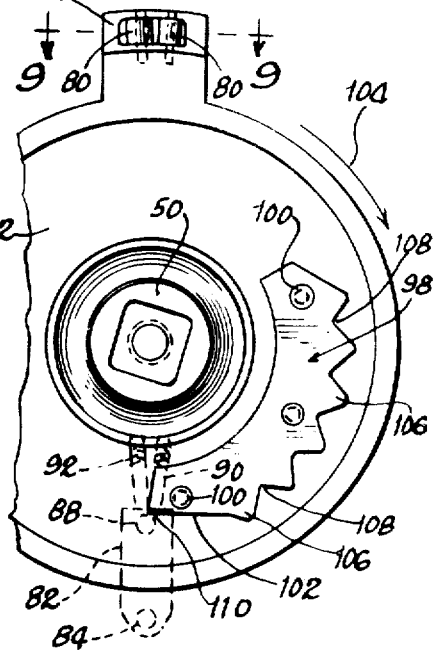
FIG. 8 is a fragmentary vertical sectional view of the receptacle door taken about the line 8—8 of FIG 6.
Figure 9:
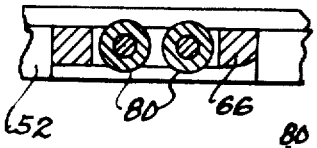
FIG. 9 is an enlarged fragmentary cross sectional view taken about the line 9—9 of FIG. 8.

The pin 88 also extends on the other side of the arm 82 into the path of movement of ratchet 98 which is secured on the inside of the drive disc 52 by means of fasteners 100. As best illustrated in FIG. 8, the ratchet defines a straight edge portion 102 which is located at the same level at the upper edge as the pin 88 when the parts are in the normal position. Since the edge 102 is horizontal, this edge will pivot the arm 82 from right to left in FIG. 8 upon rotation of the disc 52 in the direction of the arrow 104. As the rotation continues, the teeth 106 of the ratchet will sequentially engage the pin 88.

Return movement of the ratchet is prevented once the first tooth 106 passes the pin 88. This is accomplished by the fact that the grooves 108 between the respective teeth are located at a greater distance from the axis of rotation of the disc than is the corner 110 of the ratchet 98. Accordingly, once the arm 82 is pivoted in the manner described, the arm cannot be returned to the vertically upright position until after all of the teeth have passed the pin 88. In the pivoted position, the arm 82 prevents return movement of the disc.

The number of teeth 106 is selected so that sufficient rotation will be required to accomplish emptying of a cash box. When the last tooth passes the pin 88, the arm 82 will move to the upright position. The arm will then be pivoted from left to right (FIG. 8) during the return movement of the drive disc and will not return to the normal position shown until complete return rotation of the drive disc has been accomplished.

The door 30 also carries an arm 112 which moves within an opening 114 defined by the front plate 12. An opening 116 is defined by the door plate 32, and a bolt 118 extends through this opening and is threaded into the arm 112 for securing the arm to the door.

Figure 19:
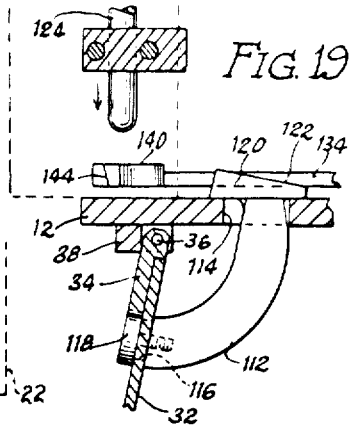
FIG. 19 is an enlarged fragmentary cross sectional view taken about the line 19—19 of FIG. 6.
Figure 20:
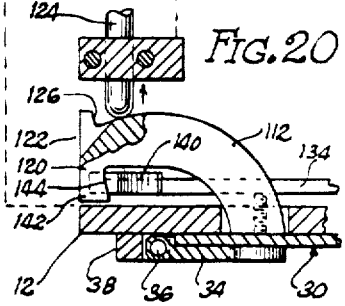
FIG. 20 is an enlarged fragmentary sectional view taken about the line 20—20 of FIG. 1; and, FIG. 21 is a side elevation, partly cut away, illustrating a suitable key structure for the receptacle.

In the open position, the arm 112 is retracted as shown in FIG. 19. The enlarged end 120 of the arm limits pivoting movement of the door. When the door is pivoted to the closed position, the surface 122 of the enlarged end 120 engages the end of rod 124 and drives this rod rearwardly until the shoulder 126 passes by the end of the rod (FIG. 20). As will be explained, the rearward movement of the rod accomplishes an unlocking operation which is necessary for rotation of the cash box within the receptacle. When this rotation begins, a shutter plate 128 is moved from the position shown in FIGS. 7 and 16. A cam 130 is attached to the bottom of the shutter plate, and this cam normally bears against a roller 132 secured to lever arm 134. The arm 134 is pivotally connected to the front plate 12 at 136, and a spring 138 urges the lever arm upwardly.

The lever arm pivots upwardly when the cam 130 is moved beyond the roller 132. This locates the cam plate 140 in the path of shoulder 142 defined by the arm 112. The notch 144 of the cam plate 140 receives the shoulder 142, this arrangement preventing opening of the door 30 once shutter 128 has been moved a sufficient distance to move the cam 130 out of engagement with the roller 132.

Figure 7:
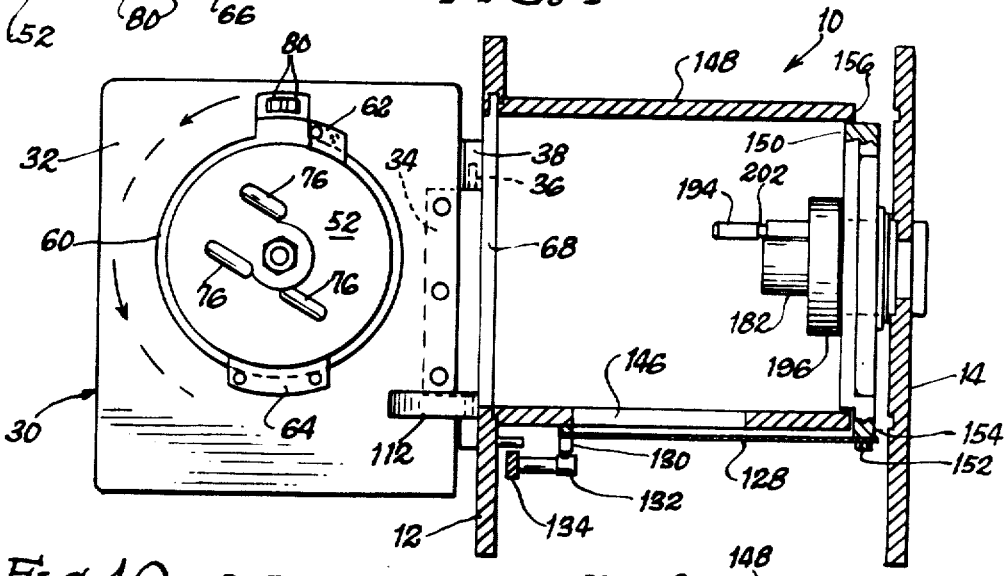
FIG. 7 is a vertical cross sectional view of the receptacle taken about the line 7—7 of FIG. 6.
Figure 10:
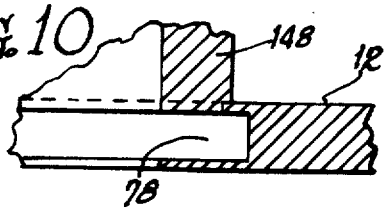
FIG. 10 is an enlarged fragmentary sectional view taken about the line 10—10 of FIG. 6.

The arrangement described functions as a means for supporting the end of the shutter 128 which is mounted in cantilever fashion as best illustrated in FIG. 7. Thus, the engagement of cam 130 with the roller 132 resists forcing of the shutter downwardly as might otherwise be accomplished when the door 30 is open and when no cash box is in place.

The shutter 128 normally blocks an opening 146 defined in the bottom of cylinder 148. The cylinder 148 is attached between the front plate 12 and rear plate 14, and this cylinder provides the receiving area for a cash box 72.

A rotatable plate 150 is mounted at the rear end of the cylinder 148, and the shutter 128 is secured by means of fasteners 152 to a rim portion 154 of this plate. The cylinder 148 includes an elongated slot 156 adjacent the back plate 14 to permit movement of the extension 154 and the associated shutter 128 relative to the cylinder. A pair of rollers 158 and 160 extend inwardly from the back plate 14 for engagement with the rim 162 of the plate 150. An extension 164 defined by the plate cooperates with the rollers to provide stop means thereby limiting the degree of movement of the plate.

A locking arm 166 is received within a notch 168 defined in the extension 154 of the rotatable plate 150. This arm is attached to the end of rod 124 so that the movement of the rod by means of the arm 112 mounted on the door will displace the arm 166 out of the notch 168. Therefore, the locking action of the arm 166 is removed only when the door of the receptacle has been closed. Accordingly, the plate 150 cannot be rotated to move the shutter 128 out of blocking position while the door is open.

The cash box 72 is of the same general construction as that described in copending application Ser. No. 20,884, *now Pat. No. 3,670,955*. The cash box thus includes an inner shell [170] defining an opening 172. The outer shell 174 of the box defines an opening 176 *the center line of which* is normally offset [120°] *90°* from the opening 172.

Figure 21:
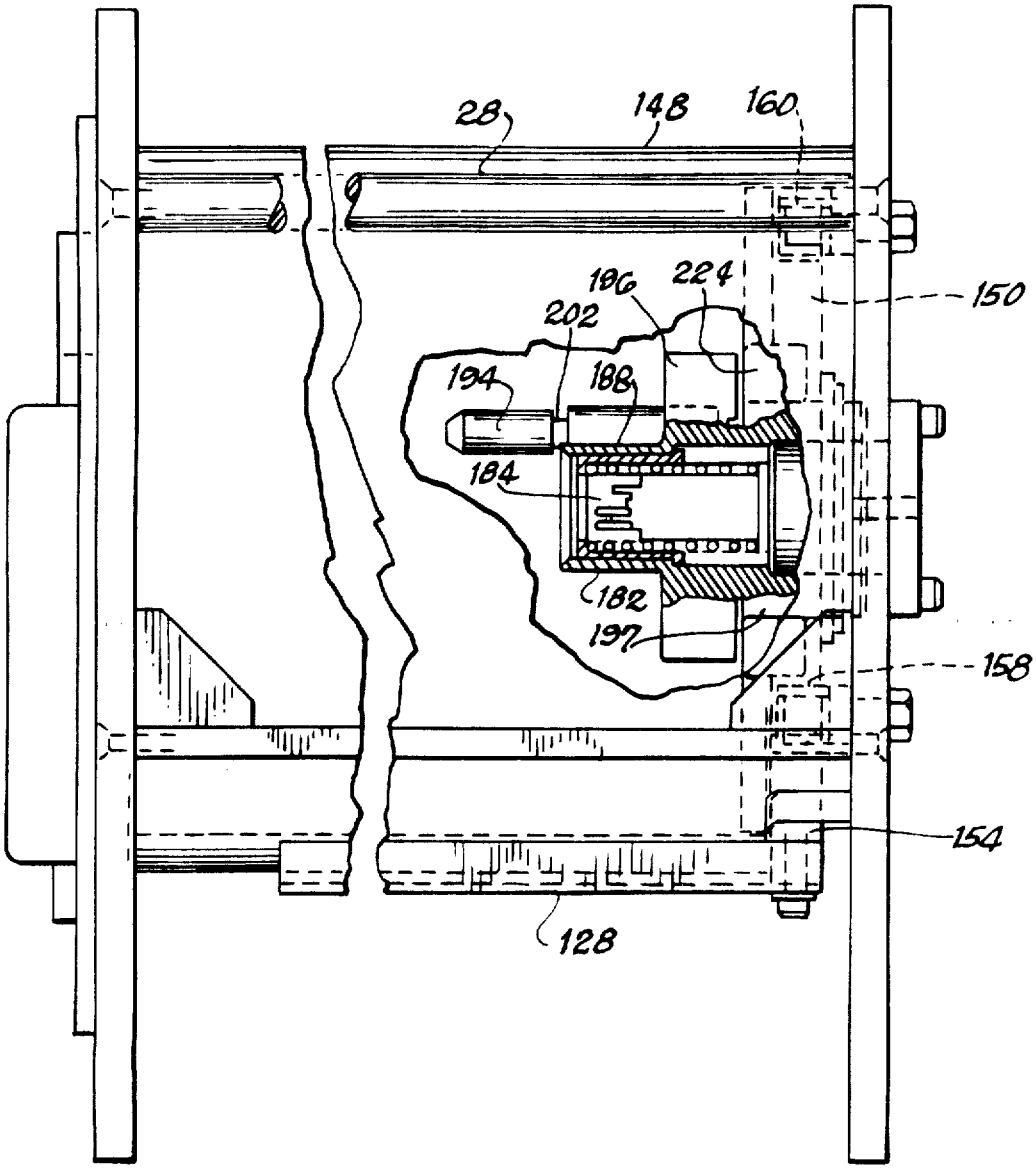

The shells are normally locked together by means of a lock 180. This lock is dimensioned to be received within the cylindrical member 182 located adjacent the rear wall of the receptacle receiving area. A key is located within the cylinder 182, and this key may take different forms such as the arrangement 184 shown in FIG. 21. This key includes projections 185 which are received within the lock to set the tumblers thereby permitting relative movement of the shells.

Figure 17:
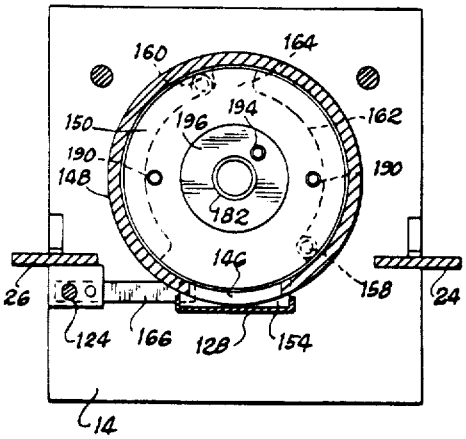
FIG. 17 is a vertical cross sectional view of the receptacle taken about the line 17—17 of FIG. 2.
Figure 18:
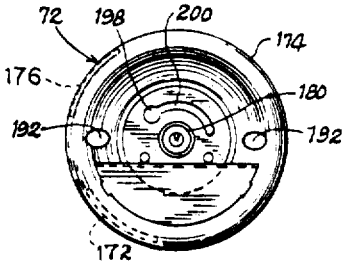
FIG. 18 is an end elevational view of the cash box taken about the line 18—18 of FIG. 15.

A spring loaded cap 188 is movable within the cylinder 182, this cap normally limiting access to the key but being movable upon insertion of the lock 180 so that the key will be inserted within the lock. A pair of aligning pins 190 (FIGS. 2 and 17) extend outwardly from the plate 150 for receipt within the openings 192 defined by the outer shell 174 (FIG. 18). An additional pin 194 is mounted on the base 196 which supports the cylindrical member 182. This pin is initially received within enlarged end 198 of the slot 200 which is also formed in the outer shell. As explained in the aforementioned copending application, the pin 194 extends through an aligned opening in the inner shell, and this arrangement serves to maintain the inner shell in a stationary position while the outer shell is rotated through the operation of the plate 150. The reduced diameter portion 202 of the pin permits receipt of the pin within the slot 200 while preventing removal of the cash box when the outer shell has been rotated relative to the inner shell. This provides an added safety feature in the event that access to the interior of the structure was secured while the openings 172 and 176 were aligned. As explained, other locking features are provided for safeguarding against such access.

A bearing 224 is provided between the cylindrical portion 197 of base 196 and the plate 150 whereby the plate can be rotated relative to the supporting structure for the key 184.

In the use of the construction illustrated, a cash box 72 is first located within the cylinder 148. The pins 190 and 194 require positioning of the cash box in the attitude shown in FIG. 6. This insures proper insertion of a key into the lock of the cash box, and in this connection, the cash box must be forced inwardly in opposition to the spring loaded cap 188. The necessary force is obtained when the door 30 is closed. It will be noted that the plate 52 of the door must be in proper alignment for locating the ridges 76 around the handle 74. When thus aligned, the extension 66 on the plate will fit within the notch 70 defined by the front wall 12.

Closing of the door causes the arm 112 to drive the rod 124 rearwardly thereby unlocking the back plate 150. The handle 56 on the exterior of the door can then be operated to rotate the plate 52 as well as the cash box which is tied to the plate. Since the pins 190 tie the outer shell 174 of the cash box to the plate 150, this plate will also rotate for moving the shutter 128.

The ratchet 98 and pawl 82 cooperate to block the plate 52 against return rotation. In this condition, the extension 66 of the plate 52 is located within the groove 78 which prevents opening of the door. The locking action of the plate 140 on the arm 112 also insures against opening of the door.

Discharge of the contents of the cash box is achieved only when the outer shell of the cash box is turned far enough to locate the opening 176 in alignment with the opening 172 of the inner shell. The inner shell opening is automatically located in alignment with the opening 146 of the cylinder 148 when the cash box is located in the cylinder. Accordingly, the contents of the cash box will drop into a vault area located beyond the opening 146.

The length of the ratchet 98 is such that dumping of the contents from the cash box will occur before the ratchet passes by the pawl 82. Accordingly, return movement of the cash box cannot be achieved until after dumping. The return movement also results in the movement of the shutter 128 back into blocking position. Furthermore, the cam 130 on the shutter 128 will drive the lever arm 134 downwardly thereby releasing the arm 112. The extension 66 on the plate 52 will move opposite the notch 70 whereby the door can be opened, and the cash box removed.

It will be understood that various changes and modifications may be made in the above described construction which provide the characteristics of this invention without departing from the spirit thereof particularly as defined in the following claims.

That which is claimed is:

1. In a collection receptacle for receiving valuables from a box wherein the box includes a discharge opening and a wall normally covering the discharge opening, said wall being movable relative to the discharge opening to thereby permit discharge of the valuables into the receptacle, the improvement wherein said receptacle defines an area for receiving said box, a door for closing access to said area, drive means carried on said door for engaging said box upon closing of the door, and means for operating said drive means whereby relative movement is developed between said box and said wall to provide for said discharge of said valuables into the receptacle.

2. A construction in accordance with claim 1 wherein said box comprises an inner shell defining a first opening and an outer shell defining a second opening which is normally displaced from said first opening, said door including means for engaging said outer shell, and said drive means operating to rotate said outer shell relative to said inner shell to bring said openings into alignment.

3. A construction in accordance with claim 2 wherein said outer shell carries a handle, and means defined by said door for embracing the handle, said handle embracing means being located on a rotatable plate carried by the door, said drive means being connected to said plate, and a handle accessible from the exterior of said receptacle for operating said drive means.

4. A construction in accordance with claim 3 including a pawl and ratchet carried on said door, said pawl and ratchet operating to prevent reverse rotation of said plate whereby said plate cannot be returned to its original position until after said valuables have been discharged from said box.

5. A construction in accordance with claim 4 wherein said ratchet comprises a tooth member mounted on said plate for movement therewith, said pawl being attached to said door in the path of movement of said ratchet.

6. A construction in accordance with claim 5 wherein said pawl includes an arm pivotally mounted on said door, engagement of said ratchet with said pawl operating to pivot said arm away from a normal position, said arm in the pivoted position locking said plate against reverse rotation.

7. A construction in accordance with claim 1 including locking means carried by said receptacle for maintaining said door in the closed position after initial operation of said drive means, and including means for unlocking said door after discharge of said valuables from said box.

8. A construction in accordance with claim 7 wherein said receptacle defines a front wall with said door being attached to said front wall, said drive means comprising a rotatable plate mounted on said door, a channel defined by said front wall and means carried on said plate adapted to be received within said channel upon closing of the door, the combination of said last mentioned means and said channel providing said locking means.

9. A construction in accordance with claim 1 including a rotatable supporting plate for receiving said box upon placing the box in the receptacle, operation of said drive means resulting in the rotation of said plate along with said box, and including means for locking said supporting plate against rotation, and means associated with said door for unlocking said locking means upon closing of the door.

10. A construction in accordance with claim 9 wherein said unlocking means associated with said door comprise an arm mounted on said door, a rod having one end positioned adjacent said door and the opposite end connected to said supporting plate, said locking means being mounted on said other end, closing of said door operating to drive said arm into engagement with said one end of said rod for displacing said locking means relative to said supporting plate whereby said plate is freed for rotation with said box.

11. A construction in accordance with claim 9 wherein said box is tubular in shape, the area of said receptacle for receiving said box comprising a hollow cylinder, said rotatable supporting plate being located within said cylinder at the rear end thereof.

12. A construction in accordance with claim 11 wherein said cylinder defines a bottom opening for the passage of valuables discharged from said box, a shutter normally blocking said opening, and means attaching said shutter to said rotatable plate whereby rotation of the plate operates to move said shutter to an unblocking position relative to said openings in said cylinder.

13. A construction in accordance with claim 12 including a lever arm pivotally mounted beneath said shutter, cam means attached to said shutter normally engaging said lever arm to hold the lever arm in a depressed position, movement of said shutter in response to rotation of said plate operating to move said cam means relative to said lever arm, spring means normally urging said lever arm upwardly whereby movement of said cam means results in pivoting of said lever arm to an upper position, and locking means associated with said lever arm adapted to lock said door in a closed position when the lever arm is in the upper position.

14. A construction in accordance with claim 13 wherein said means associated with said door comprises a movable arm, and wherein said locking means on said lever arm engages said arm when said door is closed, said cam means on said shutter operating upon return movement of said shutter after the discharge of valuables from said box to depress said lever to thereby free said locking means from engagement with said arm.

*15. A box in combination with a collection receptacle for receiving valuables from the box wherein the box includes a discharge opening and a wall normally covering the discharge opening, said wall being movable relative to the discharge opening to thereby permit discharge of the valuables into the receptacle, said receptacle defining an area for receiving said box, a door for closing access to said area, drive means carried on said door for engaging said box upon closing of the door, means for operating said drive means whereby relative movement is developed between said discharge opening and said wall to provide for said discharge of said valuables into the receptacle, means normally locking said wall against movement relative to the discharge opening, and means located within the receptacle for disengaging the locking means when the box is received within the receptacle.*

*16. A construction in accordance with Claim 15 wherein said box comprises an inner shell providing said wall and defining a first opening, and an outer shell defining a second opening which comprises said discharge opening and which is normally displaced from said first opening, said door including means for engaging said outer shell, and said drive means operating to rotate said outer shell relative to said inner shell to bring said openings into alignment.*

*17. A construction in accordance with Claim 16 wherein said outer shell carries a handle, and means defined by said door for embracing the handle, said handle embracing means being located on a rotatable plate carried by the door, said drive means being connected to said plate, and a handle accessible from the exterior of said receptacle for operating said drive means.*

*18. A construction in accordance with Claim 17 including a pawl and ratchet carried on said door, said pawl and ratchet operating to prevent reverse rotation of said plate whereby said plate cannot be returned to its original position until after said valuables have been discharged from said box.*

*19. A construction in accordance with Claim 18 wherein said ratchet comprises a tooth member mounted on said plate for movement therewtih, said pawl being attached to said door in the path of movement of said ratchet.*

*20. A construction in accordance with Claim 19 wherein said pawl includes an arm pivotally mounted on said door, engagement of said ratchet with said pawl operating to pivot said arm away from a normal position, said arm in the pivoted position locking said plate against reverse rotation.*

*21. A construction in accordance with Claim 15 including locking means carried by said receptacle for maintaining said door in the closed position after initial operation of said drive means, and including means for unlocking said door after discharge of said valuables from said box.*

*22. A construction in accordance with Claim 21 wherein said receptacle defines a front wall with said door being attached to said front wall, said drive means comprising a rotatable plate mounted on said door, a channel defined by said front wall and means carried on said plate adapted to be received within said channel upon closing of the door, the combination of said last mentioned means and said channel providing said locking means.*

*23. A construction in accordance with Claim 15 including a rotatable supporting plate for receiving said box upon placing the box in the receptacle, operation of said drive means resulting in the rotation of said plate along with said box, and including means for locking said supporting plate against rotation, and means associated with said door for unlocking said locking means upon closing of the door.*

*24. A construction in accordance with Claim 23 wherein said unlocking means associated with said door comprise an arm mounted on said door, a rod having one end positioned adjacent said door and the opposite end connected to said supporting plate, said locking means being mounted on said other end, closing of said door operating to drive said arm into engagement with said one end of said rod for displacing said locking means relative to said supporting plate whereby said plate is freed for rotation with said box.*

*25. A construction in accordance with Claim 23 wherein said box is tubular in shape, the area of said receptacle for receiving said box comprising a hollow cylinder, said rotatable supporting plate being located within said cylinder at the rear end thereof.*

*26. A construction in accordance with Claim 25 wherein said cylinder defines a bottom opening for the passage of valuables discharged from said box, a shutter normally blocking said opening, and means attaching said shutter to said rotatable plate whereby rotation of the plate operates to move said shutter to an unblocking position relative to said openings in said cylinder.*

*27. A construction in accordance with Claim 26 including a lever arm pivotally mounted beneath said shutter, cam means attached to said shutter normally engaging said lever arm to hold the lever arm in a depressed position, movement of said shutter in response to rotation of said plate operating to move said cam means relative to said lever arm, spring means normally urging said lever arm upwardly whereby movement of said cam means results in pivoting of said lever arm to an upper position, and locking means associated with said lever arm adapted to lock said door in a closed position when the lever arm is in the upper position.*

*28. A construction in accordance with Claim 27 wherein said means associated with said door comprises a movable arm, and wherein said locking means on said lever arm engages said arm when said door is closed, said cam means on said shutter operating upon return movement of said shutter after the discharge of valuables from said box to depress said lever to thereby free said locking means from engagement with said arms.*

References Cited

The following references, cited by the Examiner are of record in the patented file of this patent or the original patent.

UNITED STATES PATENTS

| | | | |
|---|---|---|---|
| 1,011,815 | 12/1911 | Kohler | 232—16 UX |
| 2,430,384 | 11/1947 | Broussard | 232—16 |
| 2,613,871 | 10/1952 | Broussard et al. | 232—16 |
| 2,815,166 | 12/1957 | Sollenberger | 232—16 |
| 3,059,837 | 10/1962 | Leiderman | 232—16 |
| 3,066,858 | 12/1962 | Tipton | 232—16 |
| 3,094,275 | 6/1963 | Pinson et al. | 232—16 |
| 3,321,129 | 5/1967 | Hutton et al. | 232—16 |

DENNIS L. TAYLOR, Primary Examiner

U.S. Cl. X.R.

109—66